(12) United States Patent
Lee et al.

(10) Patent No.: US 11,677,467 B2
(45) Date of Patent: Jun. 13, 2023

(54) METHOD FOR TRANSMITTING SIGNALS IN VISIBLE LIGHT COMMUNICATIONS AND TERMINAL FOR SAME

(71) Applicant: LG ELECTRONICS INC., Seoul (KR)

(72) Inventors: Hojae Lee, Seoul (KR); Sangrim Lee, Seoul (KR); Woonghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 17/310,562

(22) PCT Filed: Feb. 12, 2019

(86) PCT No.: PCT/KR2019/001662
§ 371 (c)(1),
(2) Date: Aug. 11, 2021

(87) PCT Pub. No.: WO2020/166732
PCT Pub. Date: Aug. 20, 2020

(65) Prior Publication Data
US 2022/0103253 A1    Mar. 31, 2022

(51) Int. Cl.
*H04B 10/116*    (2013.01)
(52) U.S. Cl.
CPC .................. *H04B 10/116* (2013.01)
(58) Field of Classification Search
CPC .................................................... H04B 10/116
USPC .......................................................... 398/116
See application file for complete search history.

(56) References Cited

U.S. PATENT DOCUMENTS

| 10,727,951 B2 * | 7/2020 | Cho ..................... H04L 27/3427 |
| 2009/0196602 A1 * | 8/2009 | Saunders ........... H04B 10/5055 398/9 |
| 2016/0127039 A1 * | 5/2016 | Guo ..................... H04B 10/116 398/115 |
| 2020/0119840 A1 * | 4/2020 | Ebrahimzad .......... H04L 1/0057 |
| 2021/0119705 A1 * | 4/2021 | Fan ....................... H04B 10/613 |

FOREIGN PATENT DOCUMENTS

| KR | 101586938 | 1/2016 |
| KR | 101709350 | 2/2017 |
| WO | 2018115483 | 6/2018 |

OTHER PUBLICATIONS

PCT International Application No. PCT/KR2019/001662, International Search Report dated Nov. 12, 2019, 14 pages.

(Continued)

*Primary Examiner* — Dalzid E Singh
(74) *Attorney, Agent, or Firm* — Lee, Hong, Degerman, Kang & Waimey PC

(57) ABSTRACT

Proposed is a method for transmitting signals in visible light communications. The method for transmitting signals in visible light communications comprises: a step of receiving interference information from a receiving end; a step of transmitting a constellation set index to the receiving end; and a step of transmitting, to the receiving end, signals modified on the basis of the constellation set index. Meanwhile, the constellation set index may be selected on the basis of the received interference information.

14 Claims, 22 Drawing Sheets

(56) References Cited

OTHER PUBLICATIONS

Dong, Jun-Ming et al., "Adaptive multi-color shift keying constellation design for visible light communications considering lighting requirement," Optics Communications, vol. 430, Jan. 2019, 8 pages.
Le Tran, Manh et al., "Layered Adaptive Collaborative Constellation for MIMO Visible Light Communication," IEEE Access (vol. 6), Dec. 2018, 15 pages.

* cited by examiner

Figure 9-Schematic mechanism for VPPM dimming

METHOD FOR TRANSMITTING SIGNALS IN VISIBLE LIGHT COMMUNICATIONS AND TERMINAL FOR SAME

CROSS-REFERENCE TO RELATED APPLICATIONS

This application is the National Stage filing under 35 U.S.C. 371 of International Application No. PCT/KR2019/001662, filed on Feb. 12, 2019, the contents of which is hereby incorporated by reference herein in its entirety.

TECHNICAL FIELD

The present disclosure relates to a method for transmitting a signal in visible light communication, and more particularly, to an adaptive constellation design of visible light communication.

BACKGROUND ART

Next-generation mobile communication systems beyond 4G assume multipoint cooperative communication, where multiple transmitters and receivers exchange information in a network composed thereof, to maximize information transfer rates and avoid communication shaded areas. According to information theory, in such a communication environment, flexible information transmission over multipoint channels formed in the network may not only increase the transfer rate but also reach the total network channel capacity, compared to when all information is over point-to-point channels.

Visible light communication (VLC) is a communication scheme using visible light (e.g., light having a wavelength in the range of about 400 to 700 nanometers (nm) visible to the human eye) to wirelessly transmit data (e.g., voice data, numeric data, and image data). light having a wavelength in the range of nanometers (nm)). To transmit data using the VLC, a visible light source, such as a fluorescent light bulb or light emitting diode (LED), may be intensity-modulated or turned on and off at a very high rate. A reception device (e.g., a camera, an imager of a mobile phone, or an ambient light sensor) may receive the intensity-modulated light and transform the same into data that may be processed by the reception device so as to be used and/or enjoyed by the user.

In the VLC, a color gamut of a light source that may be transmitted depends on a hardware capability of the transmission device. In addition, the reception device is greatly affected by the color characteristics of interference light present in the vicinity. Therefore, there is a need for a modulation scheme for efficient signal decoding at the receiving sides.

DISCLOSURE

Technical Problem

An object of the present disclosure devised to solve the above-described problem is to provide a method for transmitting a signal in visible light communication capable of reflecting i) hardware characteristics of a transmission device and ii) characteristics of interference light.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The object of the present disclosure can be achieved by providing a method for transmitting a signal by a transmitting terminal in visible light communication, the method including receiving interference information from a receiving terminal, transmitting a constellation set index to the receiving terminal, and transmitting a signal modulated based on the constellation set index to the receiving terminal. The constellation set index may be selected based on the received interference information.

The interference information may be generated based on an intensity of an interference light source sensed by the receiving terminal.

The method may further include transmitting a reference signal sequence for channel measurement to the receiving terminal, wherein, based on measuring, by the receiving terminal, a channel using the reference signal sequence, the interference information may be generated.

The transmitting terminal may select a constellation set avoiding a region of an interference light source indicated by the received interference information.

The transmitting terminal may increase a signal strength of a color channel corresponding to a region of an interference light source indicated by the received interference information.

The constellation set index may be selected further based on a hardware capability of the transmitting terminal.

The signal may be modulated through color-shift keying (CSK) modulation.

Advantageous Effects

A method for transmitting a signal in visible light communication according to an aspect of the present disclosure may provide an adaptive constellation set design that reflects the characteristics of a presented color gamut that depends on the mechanical characteristics of a light source (LED). Accordingly, by using a constellation set defined based on hardware capability, the decoding impairment between the receiving side and the transmitting side may be minimized while maintaining the maximum Euclidean distance between constellations.

A method for transmitting a signal in visible light communication according to another aspect of the present disclosure may provide an adaptive constellation set design that reflects the characteristics of interference with a specific color according to the environment at the receiving side. Accordingly, the effect of specific interference may be minimized by uniformly maintaining the SINR of the receiving side by avoiding the influence of an interference light source.

With a method for transmitting a signal in visible light communication according to another aspect of the present disclosure, system stability may be enhanced by uniformly maintaining the SINR of the receiving side by compensating for the effect of an interference light source through adaptive power control.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this specification, illustrate embodiments of the disclosure and together with the description serve to explain the principles of the disclosure.

BEST MODE

Figure 1:
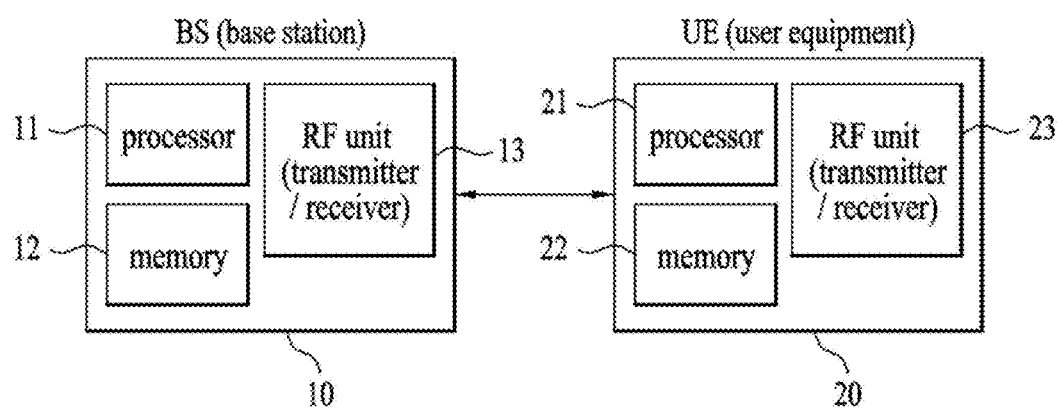
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5th generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
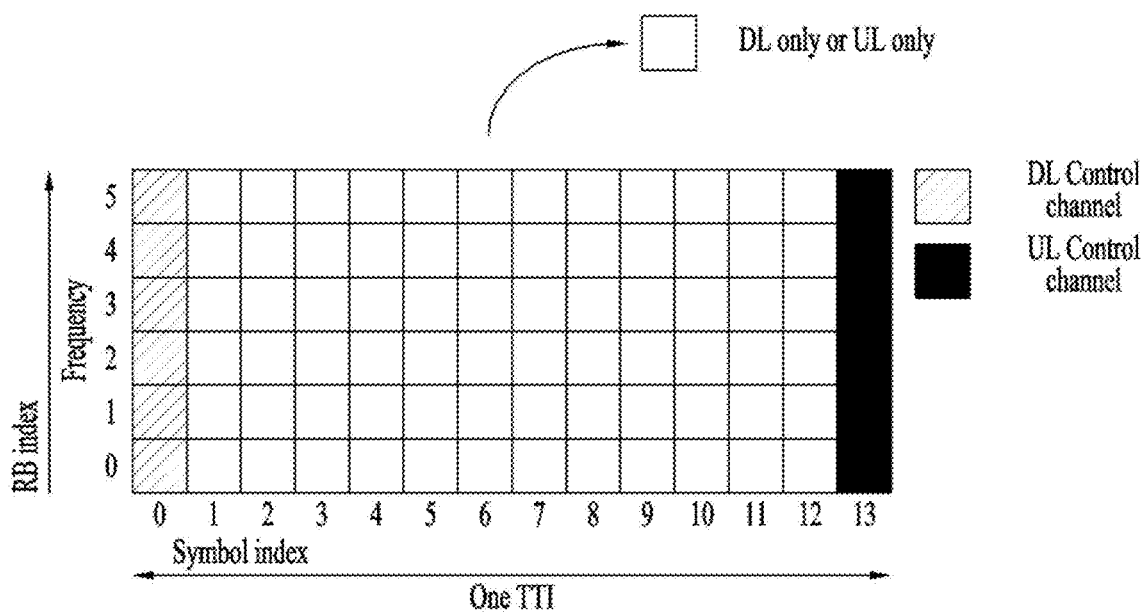
FIG. 2 is a diagram illustrating an exemplary subframe structure in which a data channel and a control channel are multiplexed in time division multiplexing (TDM)

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

Visible Light Communication (VLC)

Figure 3:
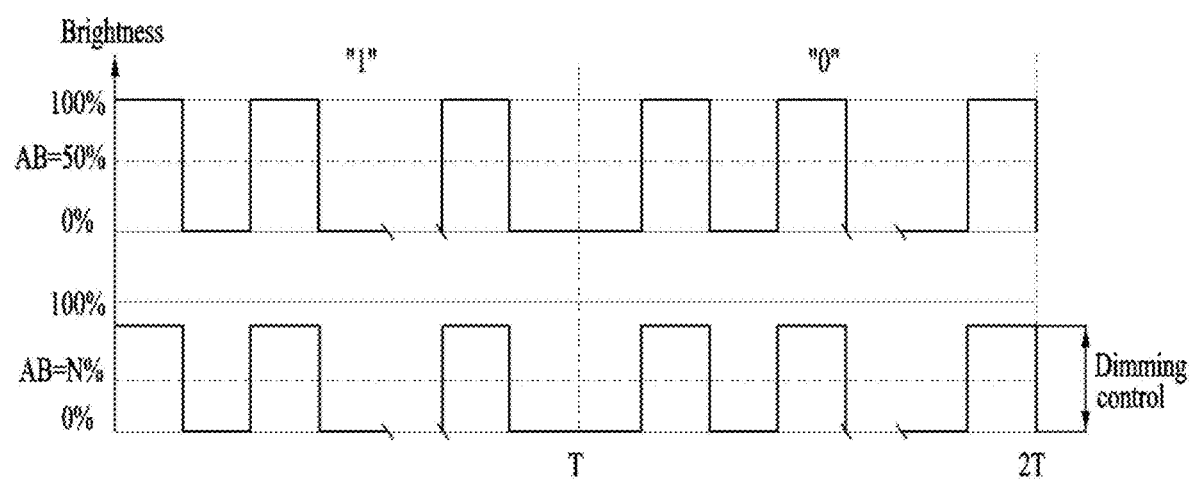
FIGS. 3 to 4 are diagrams illustrating single carrier modulation (SCM) for visible light communication.
Figure 4:
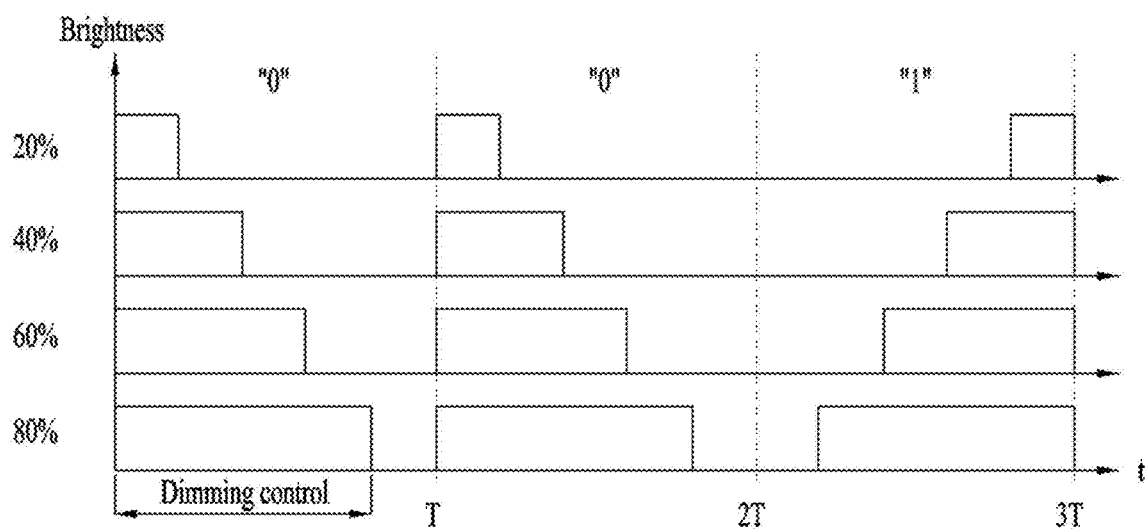

Generally, for a visible light systems, single carrier modulation (SCM) schemes based on on-off keying (OOK) for presenting signals based on flickering of visible light are provided. Referring to FIGS. 3 and 4, OOK modulation is a scheme of presenting digital signals 1 and 0 according to the ON and OFF of the light source. OOK modulation may be modified to methods such as pulse position modulation (PPM), which performs modulation into a pulse position based on a clock.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

Figure 5:
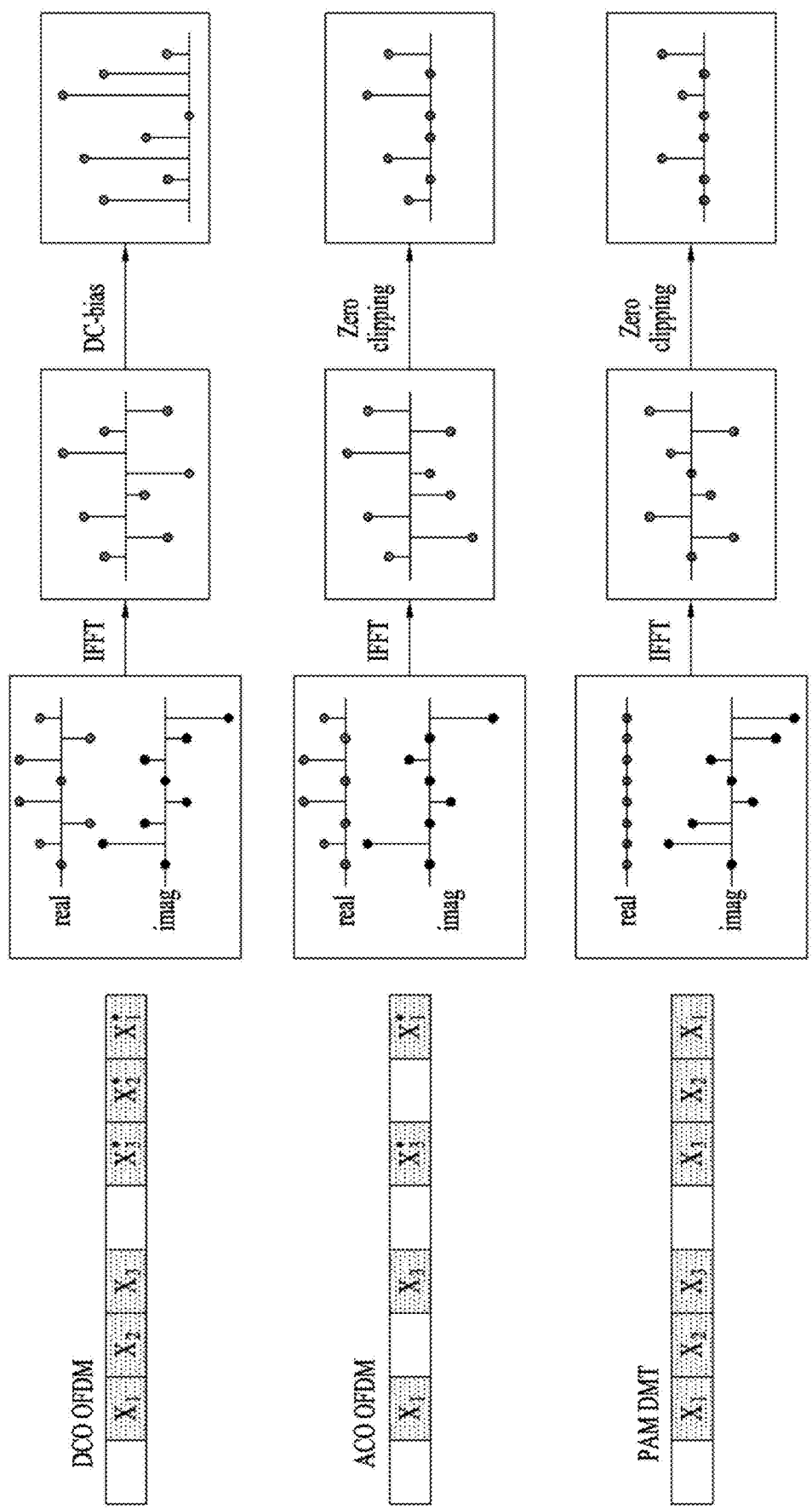
FIG. 5 is a diagram illustrating multi-carrier modulation (MCM) for visible light communication.

Various MCM schemes satisfying the above conditions have been introduced. These MCM schemes may be classified into DC-biased optical OFDM (DCO-OFDM), asymmetrically clipped optical OFDM (ACO-OFDM), and pulse-amplitude modulated discrete multi-tone modulation (PAM-DMT). These schemes will be described with reference to FIG. 5.

i) DCO-OFDM: This corresponds to the first subcarrier mapping of FIG. 5, in which modulated symbols are Hermitian symmetrically arranged. The Hermitian symmetric arrangement means arranging symbols in the form of conjugate so as to be symmetry with respect to the DC subcarrier as a boundary. In this arrangement method, a waveform in the time domain is transformed into a real value signal. Thereafter, a final unipolar time domain signal is created by biasing the transformed signal as much as the minimum value (i.e., negative value with maximum amplitude) in the time domain stage.

ii) ACO-OFDM: This corresponds to the second subcarrier mapping of FIG. 5. Half of the modulated symbols in DCO-OFDM are arranged Hermitian symmetrically at constant intervals. In this subcarrier mapping, a waveform in the time domain takes the form of a real value signal and is repeated with an inverted sign. Then, a final unipolar time domain signal is created by zero clipping the waveform that appears repeatedly as described above.

iii) PAM-DMT: This corresponds to the third subcarrier mapping of FIG. 5. In this scheme, a real value signal is placed in the imaginary part by flipping the same with respect to the center in the PAM fashion. In this subcarrier mapping, the waveform in the time domain takes the form of a real value signal and repeatedly appears in a symmetric form with an inverted sign. Similar to ACO-OFDM, a final unipolar time domain signal is created by performing zero clipping.

Table 1 describes the performance measure of each of the aforementioned schemes DCO-OFDM, ACO-OFDM and PAM-DMT. The performance measure may be, for example, spectral efficiency (SE), PAPR, signal-to-noise ratio (SNR), or bit error rate (BER).

TABLE 1

|  | SE | SNR | BER |
| --- | --- | --- | --- |
| DCO OFDM | O | X | X |
| ACO OFDM | X | O | O |
| PAM DMT OFDM | X | O | Δ |

Referring to Table 1, DCO-OFDM has half the SE for the Hermitian symmetry, but this may be seen as the most optimal SE in unipolar OFDM. However, in DCO OFDM, the SNR characteristic is deteriorated because a portion of the transmit power actually carried on the signal is small due to the bias (wherein the DC-bias value is a constant, and does not affect the performance of modulated symbol detection at the receiving side).

Referring to Table 1, ACO-OFDM has a disadvantage of having half SE of DCO OFDM. However, since DC bias is not required and the entire transmit power is carried on the desired signal, this scheme has a relatively good SNR characteristic.

Referring to Table 1, the PAM DMT has almost the same characteristics as the ACO OFDM. However, it is based on amplitude in one dimension, rather than using a quadrature complex symbol for modulation. Accordingly, the distance between symbols is reduced, and thus BER performance is lower than that in ACO OFDM.

Figure 6:
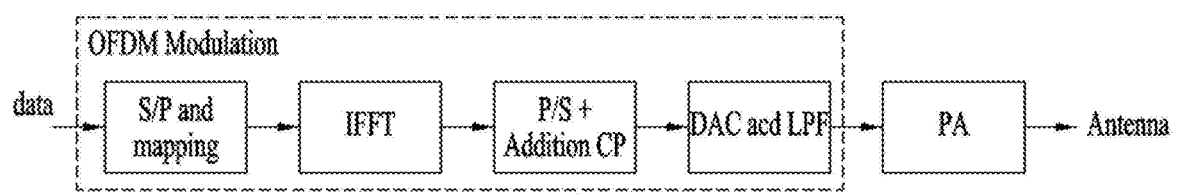
FIG. 6 is a diagram illustrating the OFDM modulation structure at the transmitting side of the conventional RF communication system.

FIG. 6 is a diagram illustrating the OFDM modulation structure at the transmitting side of the conventional RF communication system. Referring to FIG. 6, an analog signal obtained through OFDM modulation is amplified through an RF power amplifier (PA). In this case, the maximum amplified magnitude of the signal may be limited by the performance limit of the PA.

Figure 7:
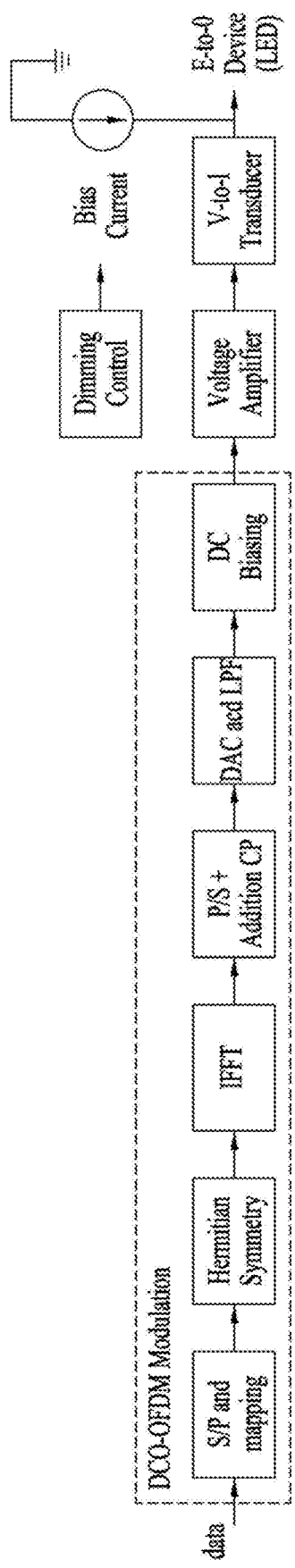
FIGS. 7 to 8 are diagrams illustrating the structure of a multi-carrier modulation transmitter of a visible light communication system.
Figure 8:
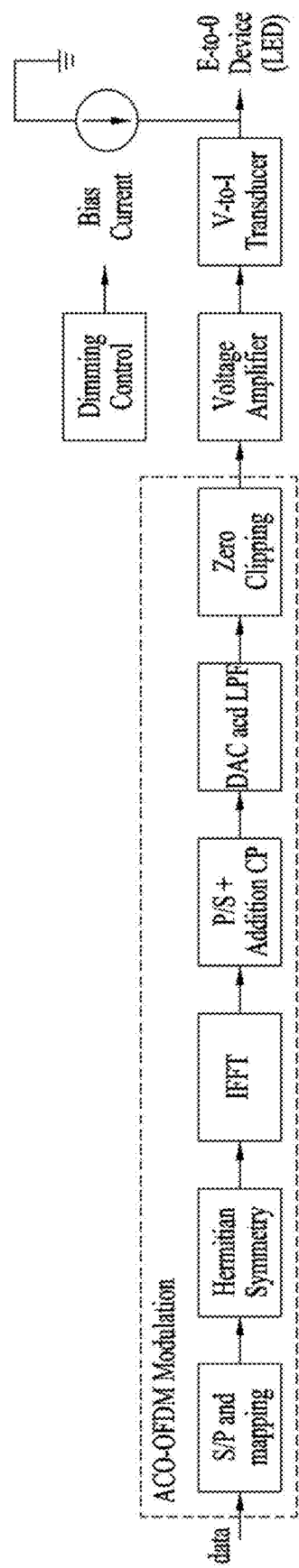

On the other hand, the structure of a multi-carrier modulation transmitter of the visible light communication system as shown in FIGS. 7 to 8. More specifically, FIG. 7 shows the structure of a DCO-OFDM modulation transmitter of the VLC communication system, and FIG. 8 shows the structure of an ACO-OFDM modulation transmitter of the VLC communication system.

Referring to FIGS. 7 to 8, a voltage amplifier, a voltage-to-current (V-to-I) transducer, and an electrical-to-optical (E-to-O) device (e.g., LED) all have non-linear characteristics. Therefore, an analog signal obtained through modulation is amplified and transformed. In FIGS. 7 to 8, dimming control through DC biasing is exemplified. In the case of the operation based on reverse polarity, dimming control may be performed through signal reconstruction.

Color-Shift Keying (CSK) Modulation

Figure 9:
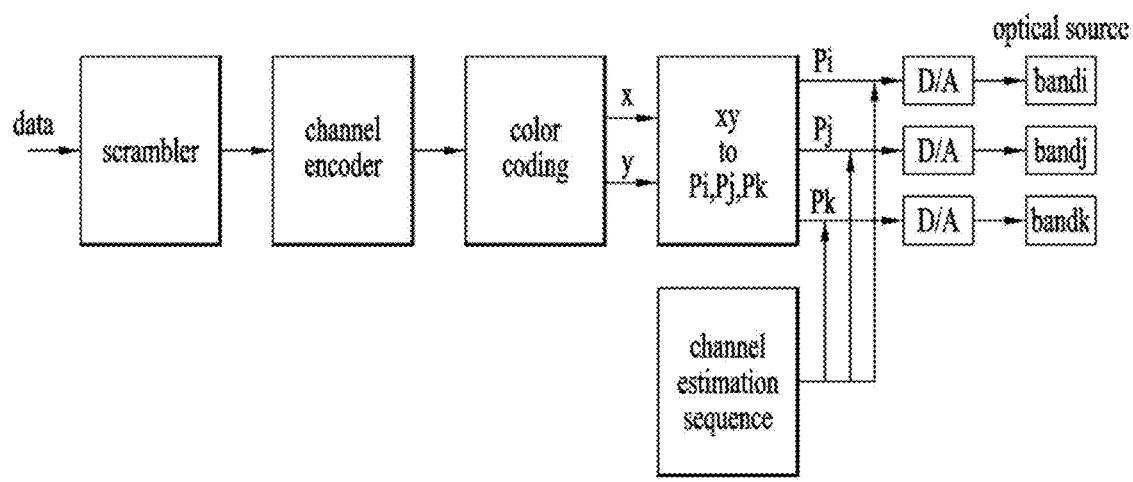
FIG. 9 is a diagram illustrating color-shift keying (CSK) modulation.

The aforementioned SCM and MCM may be operated based on color-shift keying (CSK) modulation. CSK modulation is a method for expressing a digital signal by combining colors based on the color characteristics of a light source. For example, when a digital signal is generated as illustrated in FIG. 9, the digital signal is transformed into a (x, y) color space signal through color coding. The transformed (x, y) color space signal is transmitted by a light source having a color. The color space may be defined as shown in FIG. 10, and the chromaticity distribution table may conform to the CIE 1931 color space (IEEE 802.15.7).

Figure 10:
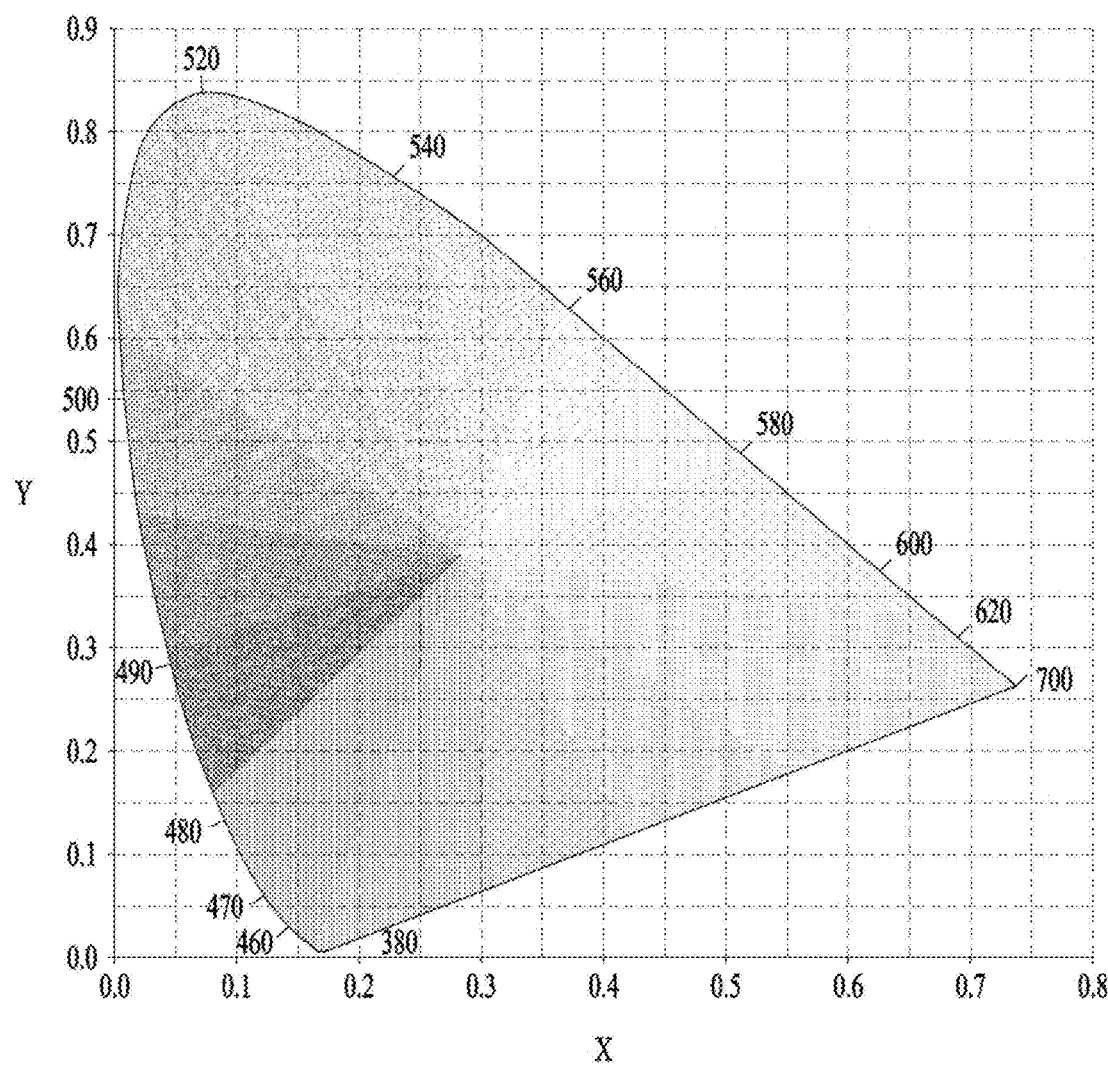
FIGS. 10 to 11 are diagrams illustrating an entire color space according to wavelength and a specific color space that may be expressed according to device characteristics.
Figure 11:
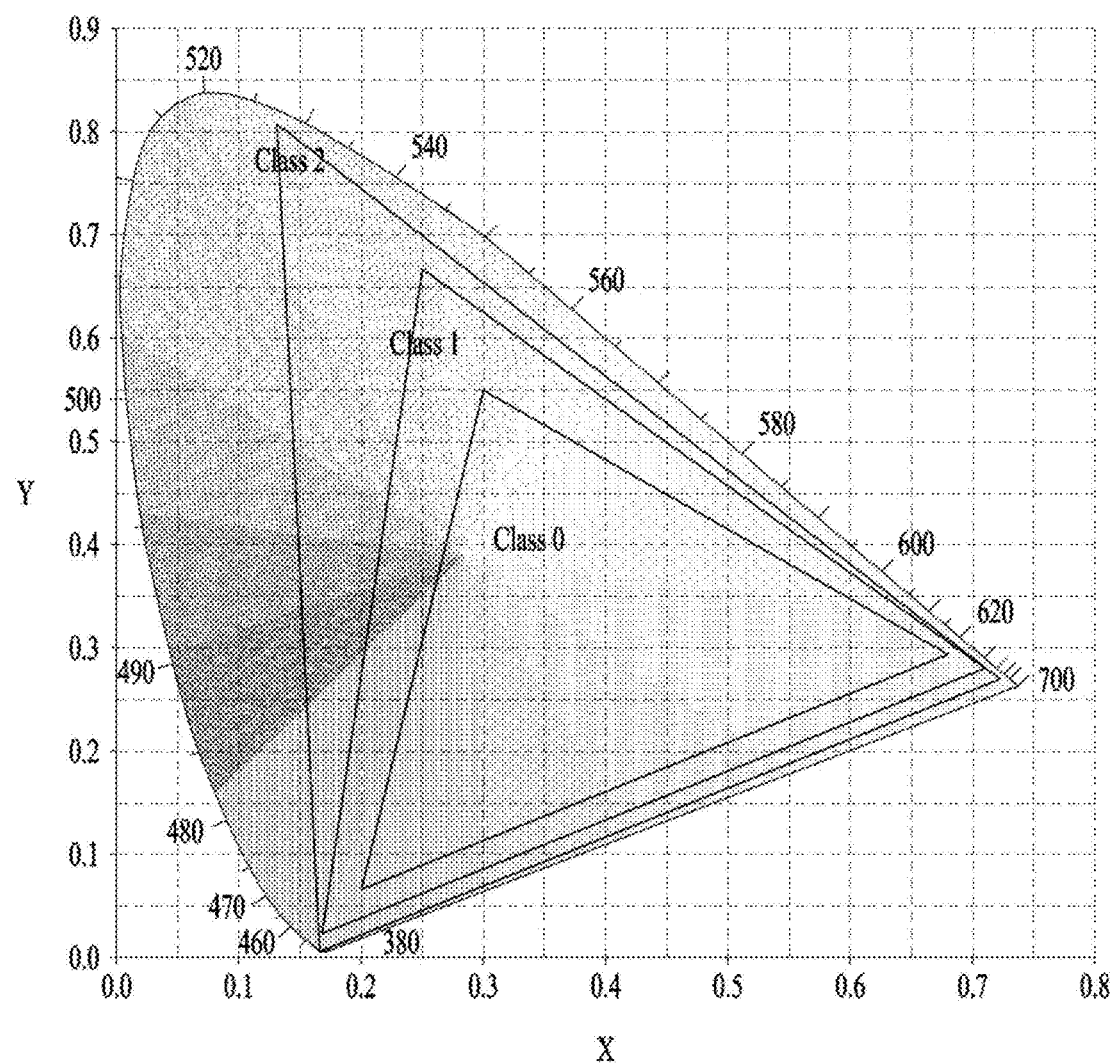

Referring to FIG. 10, the outer curved boundary line corresponds to monochromatic light, and the wavelength of each monochromatic light is indicated in nanometers. The colors shown in FIG. 10 may slightly differ among the color spaces of the color display devices. No conventionally known device may accurately present all the colors shown in FIG. 10. That is, as shown in FIG. 11, the range of colors that may be expressed may differ among the classes of equipment.

When one color is not represented by monochromatic light, it may be generated by mixing a plurality of color light sources (e.g., LEDs). The color point (x, y) is transformed by RGB. Referring to Equation 1, R, G, and B values are transformed into X, Y, and Z values to correspond to (x, y) values in the color space.

$$X = 2.7689R + 1.7517G + 1.1302B$$ [Equation 1]
$$Y = R + 4.5907G + 0.0601B$$
$$Z = 0.0565G + 5.5943B$$
$$x = \frac{X}{X+Y+Z}, y = \frac{Y}{X+Y+Z}$$

Figure 12:
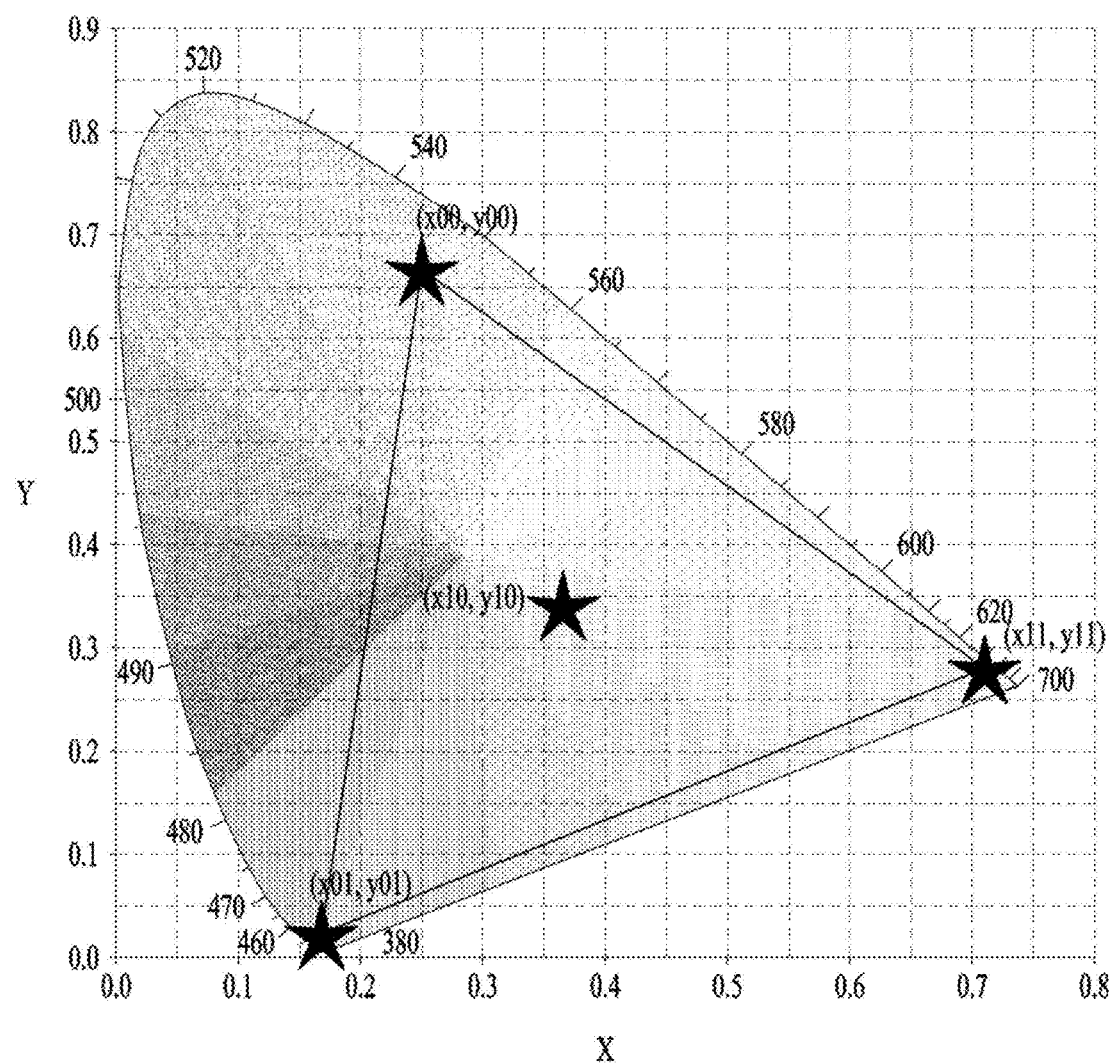
FIG. 12 is a diagram illustrating a method for modulating a binary digital signal in a color space.

Based on the above characteristics, a binary digital signal may be modulated. For example, when it is assumed that the range of colors that may be expressed by a specific device is given as shown in FIG. 12, a binary bit stream corresponding to the star-shaped marks may be defined as shown in Table 2. That is, a signal may be modulated based on the Euclidean distance in the color space.

TABLE 2

| 4 CSK | Set Class 0 |
|---|---|
| 00 | (x00, y00) |
| 01 | (x01, y01) |
| 10 | (x10, y10) |
| 11 | (x11, y11) |

Figure 13:
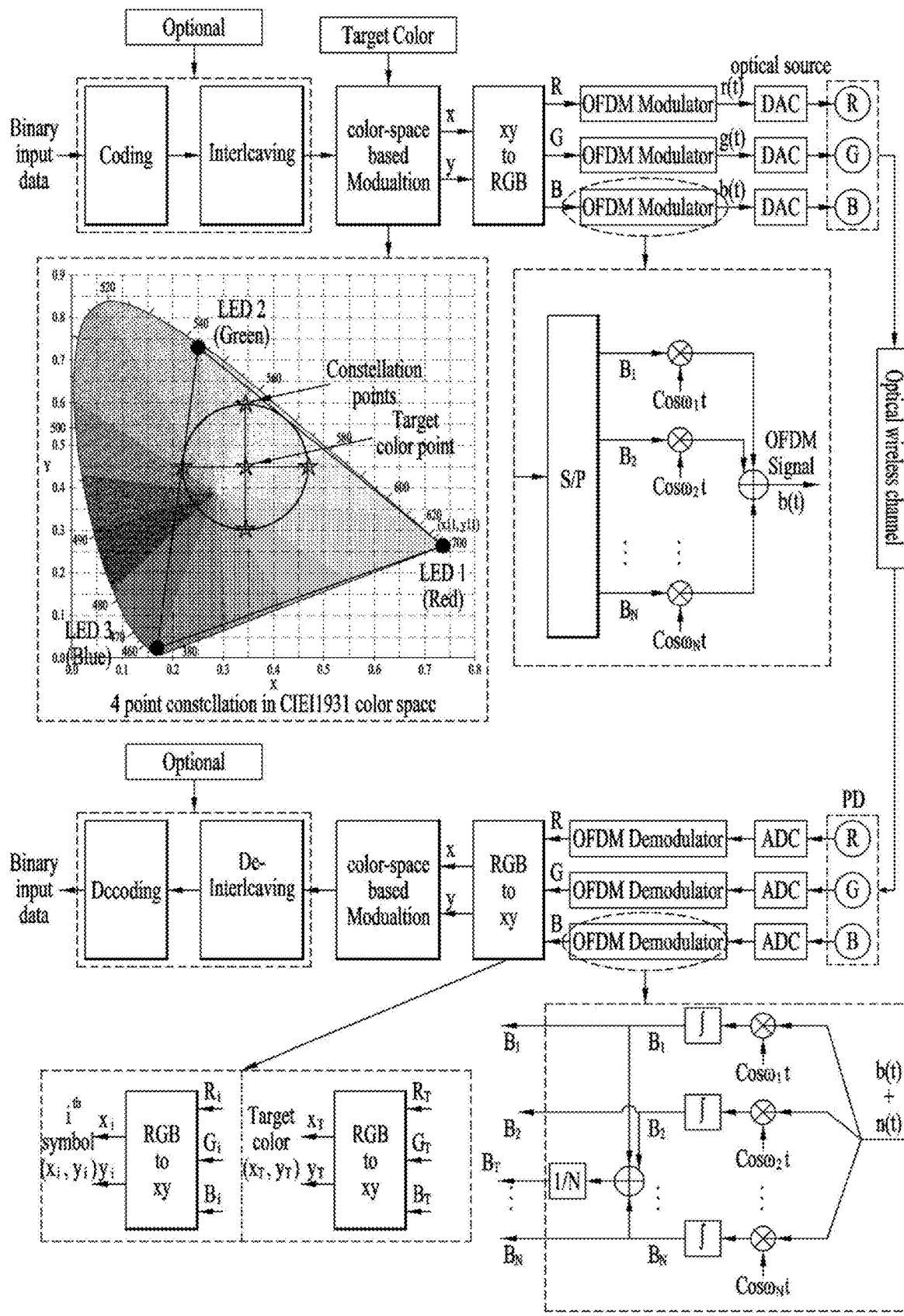
FIG. 13 is a diagram illustrating application of color-shift keying (CSK) modulation to MCM.

The above-described method applied to the MCM may be configured as shown in FIG. 13. That is, as in SCM, the transmitter i) transforms an analog signal generated through an OFDM modulator for R, G, and B values corresponding to (x, y) coordinates in a color space into an optical source through each light source, LED, and ii) transmits the sources on an optical channel. The receiver ii) receives a signal through a photo diode, ii) converts the analog signal to a digital signal through an OFDM demodulator, and iii) matches each signal of R, G, and B to color space (x, y) and decodes the signal by the (x, y) values.

The above-described methods provide a different range of represented colors according to device and are greatly affected by the color characteristics of interference light. Therefore, for efficient decoding at the receiving side, a modulation scheme capable of reflecting i) device characteristics and ii) interference light characteristics is needed.

Adaptive Constellation Design

The present disclosure proposes a technique of adaptive color shift keying (CSK) modulation that reflects i) device characteristics of a light source and ii) characteristics of interference light in visible light communication. Specifically, a method for operating an adaptive constellation set according to an interference source will be described with reference to FIGS. 14 to 17, and a method for operating an adaptive constellation set according to hardware capability will be described with FIGS. 18 to 19. Signaling at a transmitting side and a receiving side for operation of an adaptive constellation set will be described with reference to FIGS. 20 to 23.

Implementation 1. Method for Operating Adaptive Constellation Set According to Interference Source In the CSK modulation scheme, modulation constellation is designed in the color space based on the characteristics of color. Accordingly, when an interference light source has a color characteristic, the degree of interference may differ among constellations. For example, in a forest or forest area, there may be a high frequency of reflected light of green (G). In an unpaved or desert area, there may be a high frequency of reflected light of yellow (R and G). In a method for modulating a signal in visible light communication according to an aspect of the present disclosure, a method for minimizing the influence of interference light using the characteristics of the interference light is proposed.

Implementation 1.1. Color Interference Measurements

According to an aspect of the present disclosure, CSK modulation (e.g., a camera) may be used to measure interference light. The color of the interference light source may be recognized from the surrounding environment recognized through a visual sensor, and color interference may be derived in the application layer based on the intensity of the color perceived or measured by the visual sensor.

Figure 14:
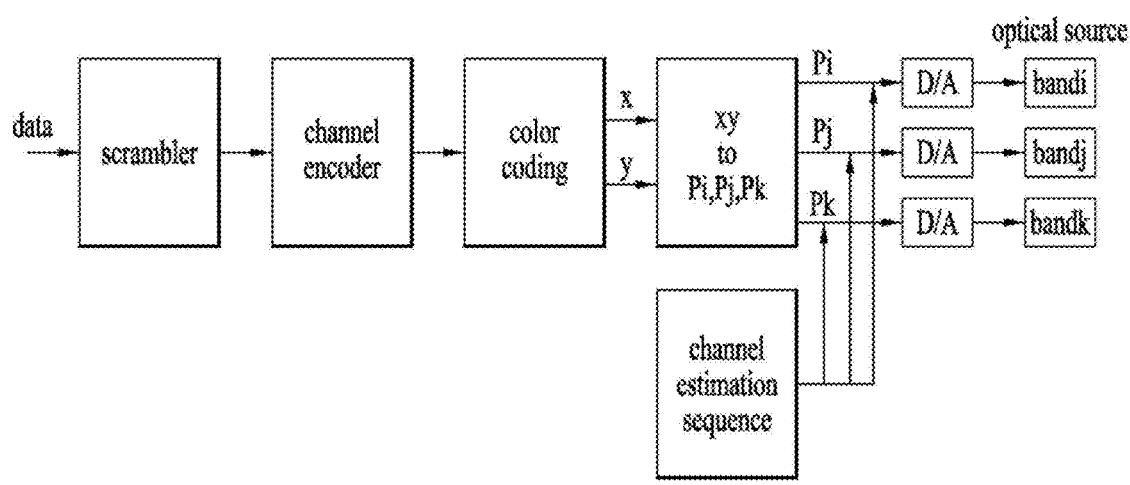
FIGS. 14 to 17 are diagrams illustrating a method for operating an adaptive constellation set according to an interference source.
Figure 15:
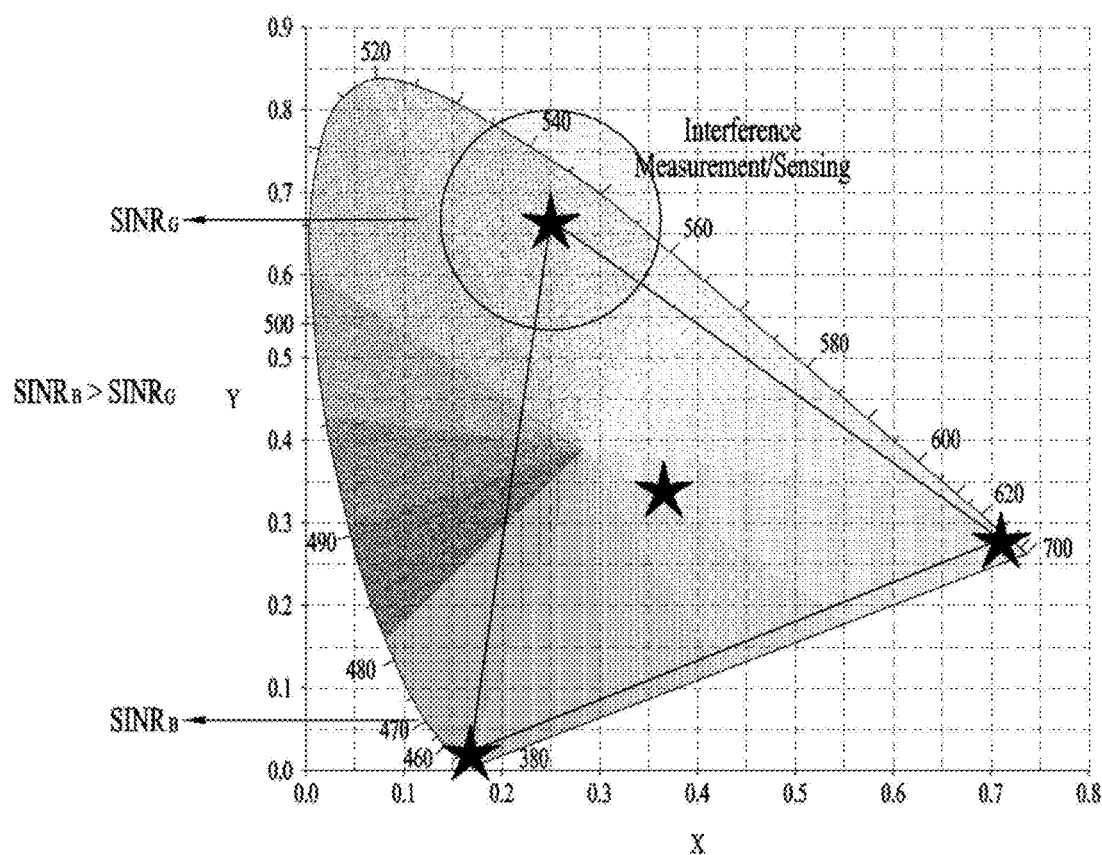

The interference light may be specified through a reference signal. Interference for each color may be measured based on the SINR measurement received through the photo diode in the physical layer. More specifically, when Pi, Pj, and Pk are signals corresponding to R, G, and B colors as shown in FIG. 14, the transmitter may use a reference signal sequence for channel estimation for each color. The receiver may measure the received power of the photo diode through a filter for each color and estimate the SINR. Referring to FIG. 15, it may be seen that there is a difference in SINR between the colors. For example, when the amount of interference with the green light source is large, there is a difference in SINR between the colors even though the same optical channel (e.g., physical channel) is used between the transmitter and the receiver (e.g., $SINR_B = SINR_R > SINR_G$). In this case, the receiver may determine that there is interference with green light.

Figure 16:
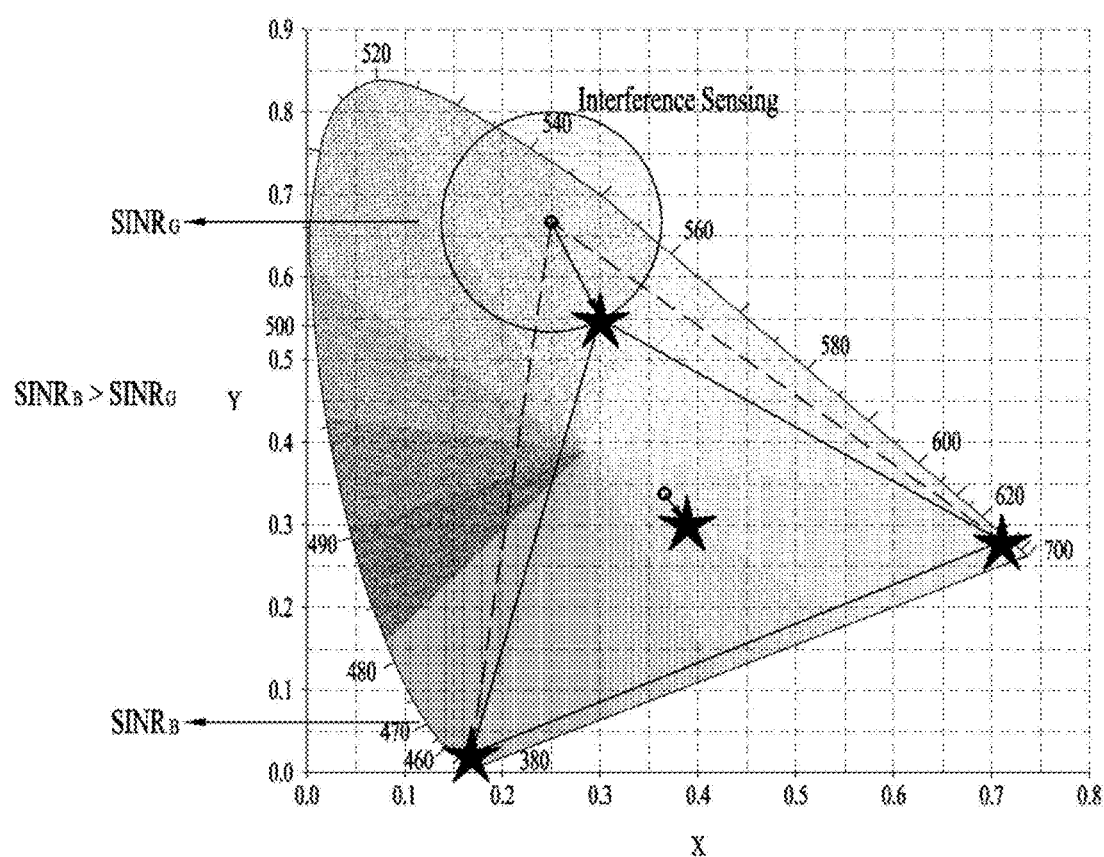

Implementation 1.2. Adaptive Constellation Design for Visible Light Communication 1.2.1. Proposed Adaptive Constellation Set Design for Interference Avoidance In the method for modulating a signal according to an aspect of the present disclosure, in order to minimize the influence of interference according to the color of the interference light source, a constellation set for modulation is defined, avoiding a region corresponding to the color of the interference light source. As shown in FIG. 16, when an interference light source for green light is measured, decoding of the region of the green light source in the color space is not valid at the receiving side. Accordingly, the transmitting side may use a new constellation set that is defined, avoiding the color space region in which the interference light source is present.

TABLE 3

| 4 CSK | Set 0 | Set IG | Set IB | Set IR |
|---|---|---|---|---|
| 00 | (x00, y00) | (xG0, yG0) | (xB0, yB0) | (xR0, yR0) |
| 01 | (x01, y01) | (xG1, yG1) | (xB1, yB1) | (xR1, yR1) |
| 10 | (x02, y02) | (xG2, yG2) | (xB2, yB2) | (xR2, yR2) |
| 11 | (x03, y03) | (xG3, yG3) | (xB3, yB3) | (xR3, yR3) |

Referring to Table 3, when the previously optimized CSK modulation set is Set 0, i) Set IG may be used when green interference light is present, ii) Set IB may be used when blue interference light is present, and iii) Set IR may be used when red interference light is presents.

The above-described method for modulating a signal may be interpreted as a method of reducing a region in which constellation may be present in the color space to avoid the influence of an interference light source. Accordingly, as the Euclidean distance between constellations is reduced, the overall performance of signal decoding may decrease. However, the SINR at the receiving side may be maintained uniformly, and thus the influence of specific interference may be minimized.

1.2.2. Proposed Adaptive Color Power Control

Figure 17:
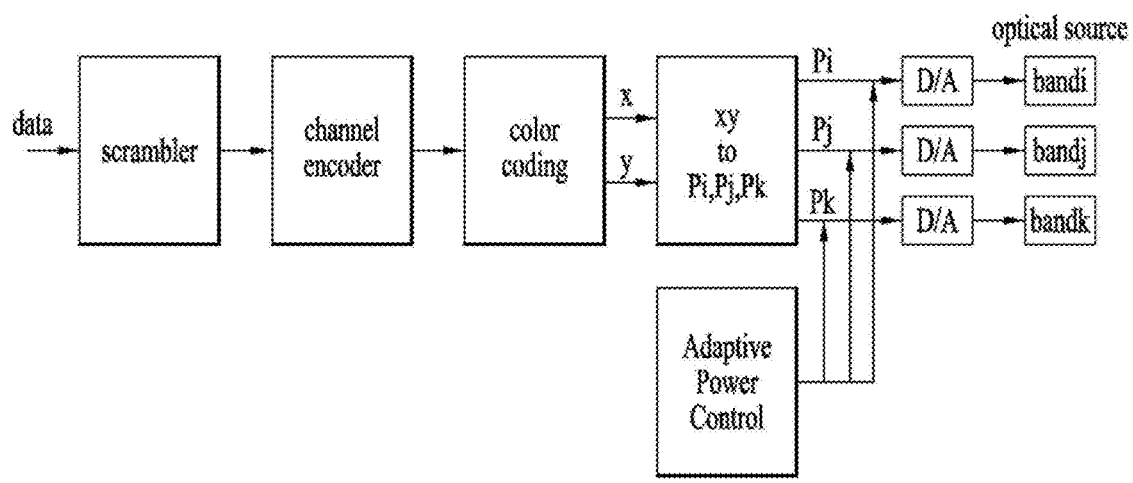

In a method for modulating a signal according to an aspect of the present disclosure, it is proposed that the SINR at the receiving side be enhanced by increasing the signal strength of a color channel corresponding to the color of the interference light source in order to compensate for the influence of interference according to the color of the interference light source. For example, when Pi, Pj, and Pk are factors that control the power of signals corresponding to R, G, and B colors as shown in FIG. 17, the influence of the interfering light source may be compensated for by controlling the signal power for each color.

For example, when a green interference light source is present, SINR G at the receiving side may be enhanced by amplifying and transmitting the magnitude of Pj corresponding to the G color by x dB. Here, x may be determined by the degree of interference. The above-described signal modulation method compensates for the influence of the interference light source through adaptive power control. Accordingly, system stability may be improved by uniformly maintaining the SINR at the receiving side, although the use of total power may be restricted.

Figure 18:
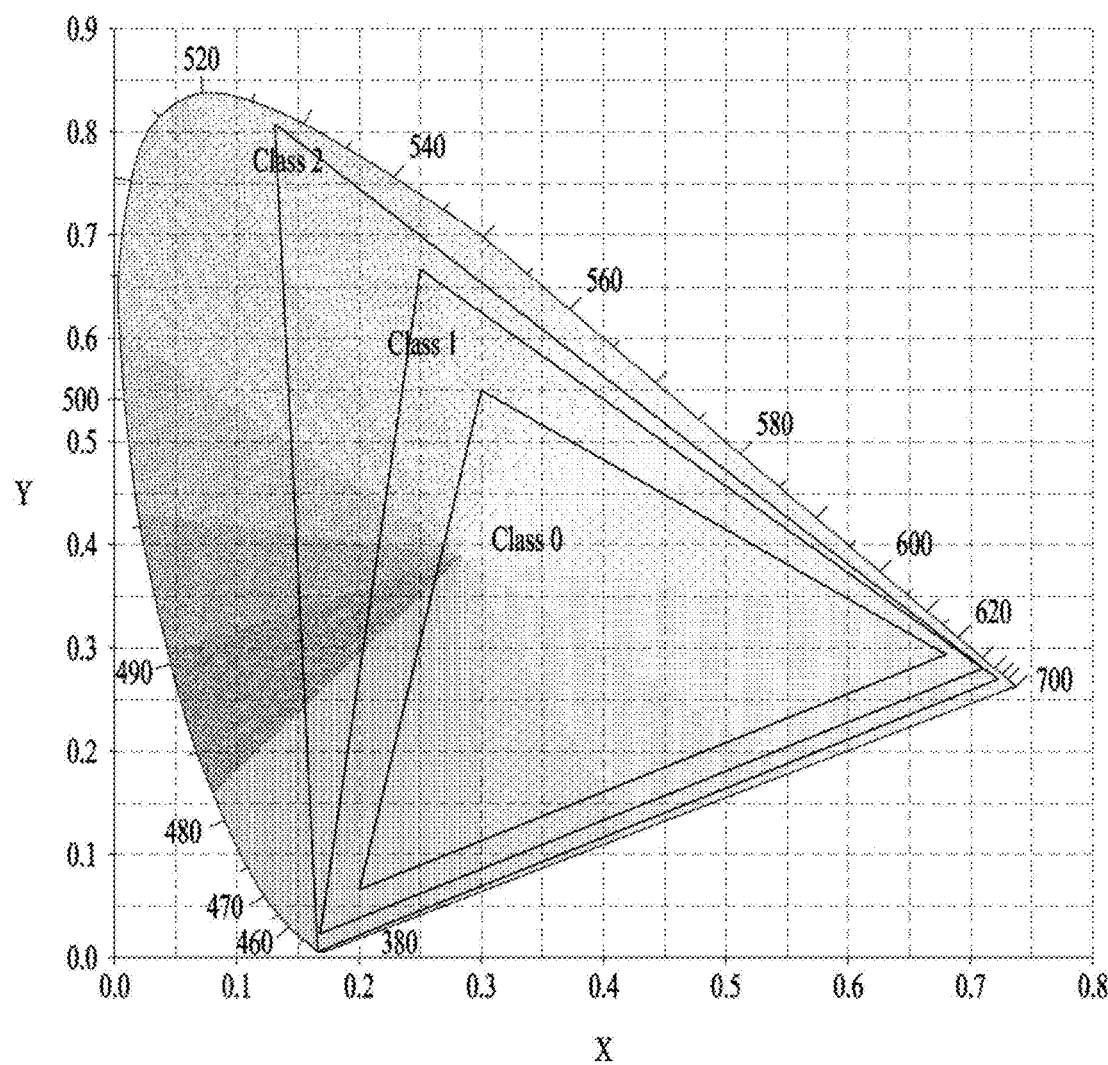
FIGS. 18 to 19 are diagrams illustrating a method for operating an adaptive constellation set according to hardware capability.

Implementation 2. Method for Operating Adaptive Constellation Set According to Hardware Capability In the CSK modulation scheme, the modulation constellation is designed in the color space based on the characteristics of color. A light source (e.g., LED, headlight, street lamp) used for visible light communication may present a different color space region according to cost or purpose of use. That is, as shown in FIG. 18, the range of colors that may be expressed may differ among the classes of equipment.

Figure 19:
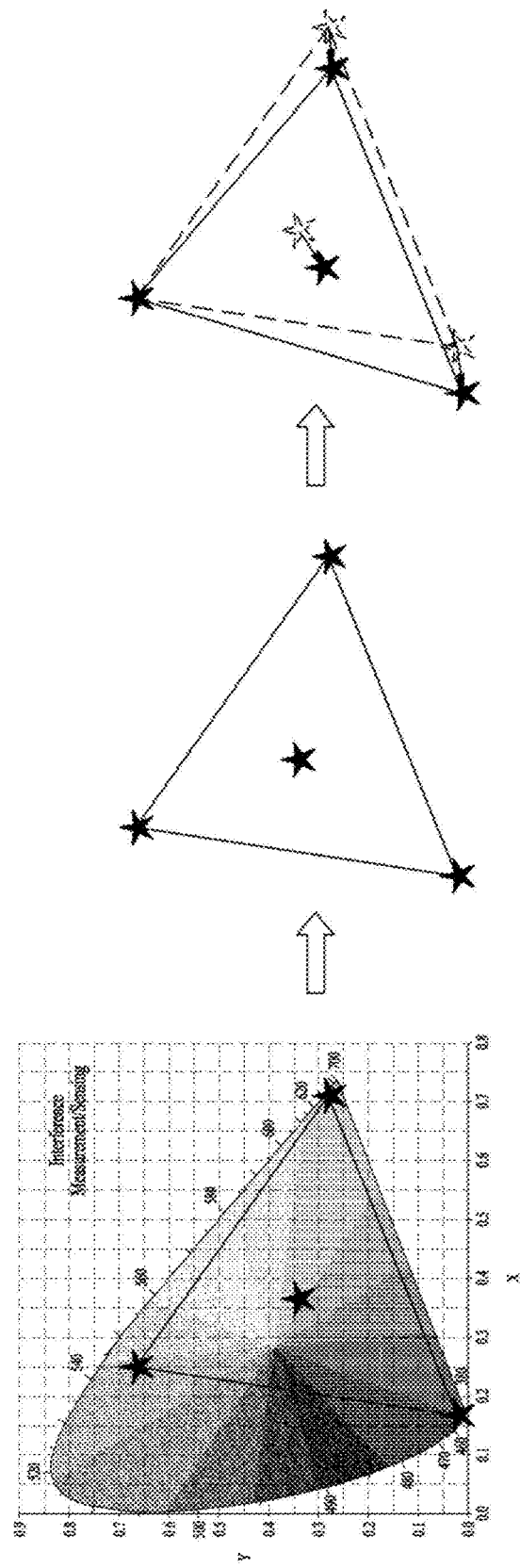

Implementation 2.1. Proposed Adaptive Constellation Set Design for Hardware Capability The optimal constellation set for modulation may be defined according to the color space region that the light source may present. For example, as shown in FIG. 19, a region of the color space that may be presented may differ among hardware classes. The constellation set that maximizes the Euclidean distance within the color space that may be presented in each hardware class may be determined in the (x, y) color space.

For example, as shown in Table 4, when the CSK modulation set optimized for Hardware Class 0 is Set Class 0, Hardware Class N may use Set Class N as the CSK Modulation Set optimized for Hardware Class N to perform constellation design within a newly defined color space. That is, by using the constellation set defined according to the hardware capability, the maximum Euclidean distance between constellations may be maintained and the decoding impairment between the receiving side and the transmitting side may be minimized.

TABLE 4

| 4 CSK | Set Class 0 | Set Class 1 | Set Class 2 | Set Class 3 |
|---|---|---|---|---|
| 00 | (x00, y00) | (x10, y10) | (x20, y20) | (x30, y30) |
| 01 | (x01, y01) | (x11, y11) | (x21, y21) | (x31, y31) |
| 10 | (x02, y02) | (x12, y12) | (x22, y22) | (x32, y32) |
| 11 | (x03, y03) | (x13, y13) | (x23, y23) | (x33, y33) |

Implementation 2.2. Proposed Adaptive Constellation Set Design for Heterogeneous Device The aforementioned adaptive constellation set design according to the hardware capability may be applied even to heterogeneous devices. That is, a different constellation set may be operated for each Tx-Rx pair for heterogeneous devices. For example, when Device 1 is from Class 1 and Device 2 is from Class 2, transmission of data from Device 1 to Device 2 may be performed by modulating the data with Constellation Set Class 1, and transmission of data from Device 2 to Device 1 may be performed by modulating the data with Constellation Set Class 2.

Implementation 3. Signaling for Operating Adaptive Constellation Set

Signal flows between the transmitting side and the receiving side using the adaptive constellation set operation method proposed through Implementation 1 to Implementation 2 will be described below.

Implementation 3.1. Proposed Adaptive Constellation Set Indication for Interference Avoidance (Tx Selection)

Figure 20:
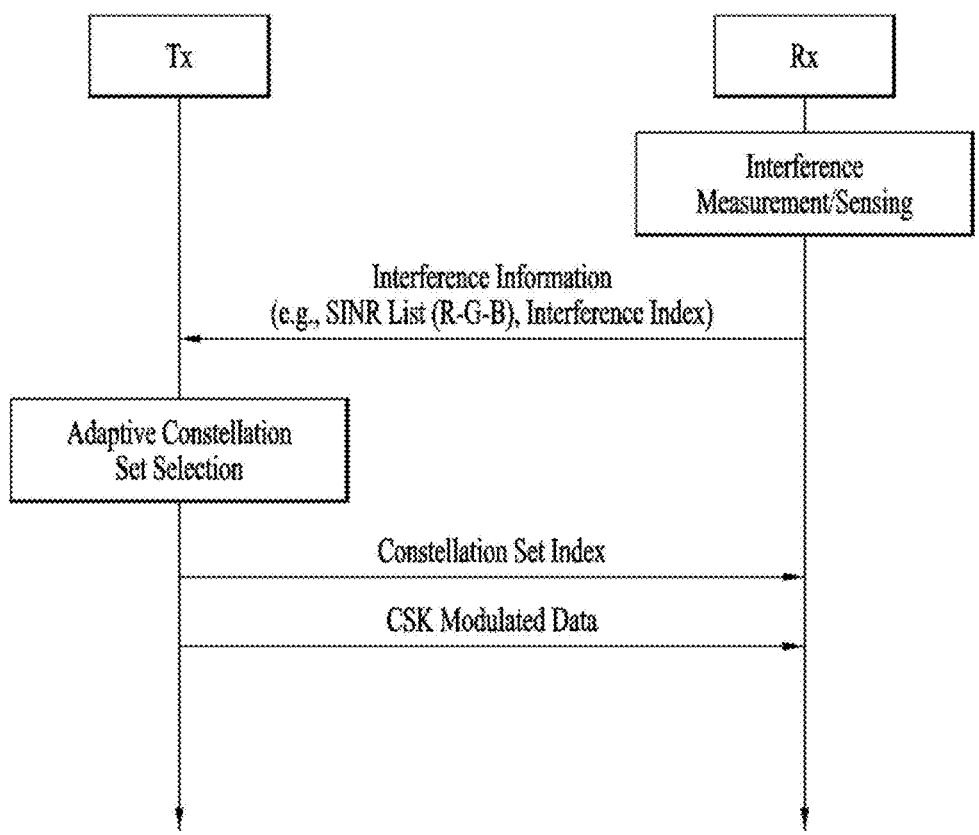
FIGS. 20 to 23 are diagrams illustrating signaling at a transmitting side and a receiving side for operation of an adaptive constellation set.

A signal flow between the transmitting side and the receiving side will be described with reference to FIG. 20.

i) A receiver (Rx) that desires to receive data performs color interference measurement or color interference sensing corresponding to Implementation 1.1. That is, the receiver may measure color interference based on visual sensor information or based on a reference signal. The color interference measurement at the receiving side may be performed periodically or when interference light is detected.

ii) The receiver transmits interference information to the transmitter (Tx) based on the measured interference information. For example, the receiver may transmit SINR information (e.g., SINR G, SINR B, SINR R) or an index of normalized interference (e.g., 00=reserved, 01=G, 10=B, 11=R) for each color channel to the transmitter. In this operation, the transmission may be performed on the control channel (e.g., in the case of LTE, PUCCH, PDCCH, or control signaling for RRC connection) or on the data channel (e.g., in the case of LTE, PUSCH, PDSCH, etc.).

iii) The transmitter (Tx) adaptively selects a constellation set based on the received Interference Information. In this case, the constellation sets may be predefined (or previously agreed upon with the receiving side Rx) information.

iv, v) The transmitter (Tx) transmits the selected constellation set index to the receiver (Rx) on the control channel. The transmitter (Tx) modulates the data to be transmitted based on the selected constellation set and transmits the modulated data to the receiver (Rx).

Implementation 3.2. Proposed Adaptive Constellation Set Indication for Interference Avoidance (Rx Selection)

Figure 21:
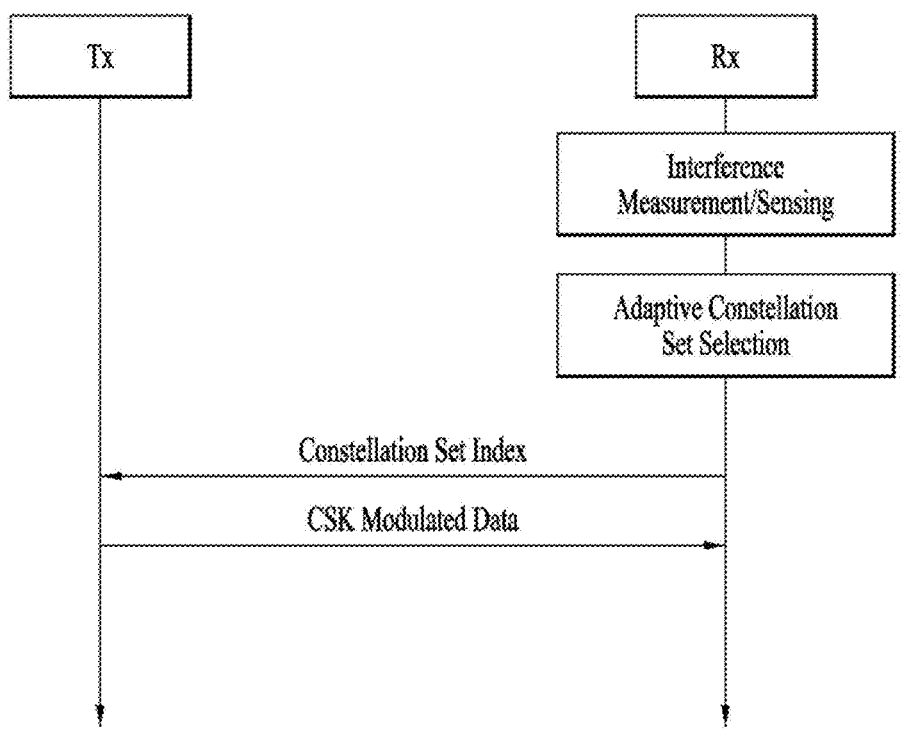

A signal flow between the transmitting side and the receiving side will be described with reference to FIG. 21.

i) A receiver (Rx) that desires to receive data performs color interference measurement or color interference sensing corresponding to Implementation 1.1. That is, the receiver may measure color interference based on visual sensor information or based on a reference signal. The color interference measurement at the receiving side may be performed periodically or when interference light is detected.

ii) The receiver (Rx) adaptively selects a constellation set based on the measured interference information. In this case, the constellation sets may be information that is predefined (or previously agreed upon with the transmitter (Tx).

iii, iv) The receiver (Rx) transmits the selected constellation set index to the transmitter (Tx) on the control channel. The transmitter (Tx) modulates the data to be transmitted based on the selected constellation set and transmits the modulated data to the receiver (Rx).

Implementation 3.3. Proposed Adaptive Power Control Indication

Figure 22:
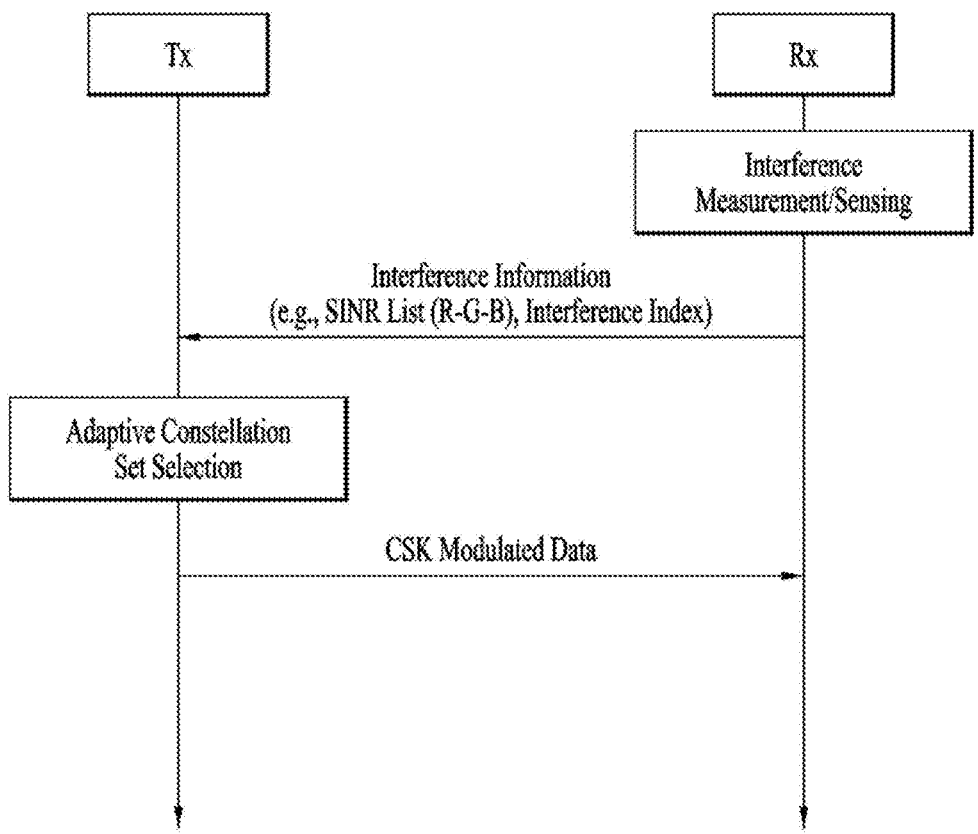
Figure 23:
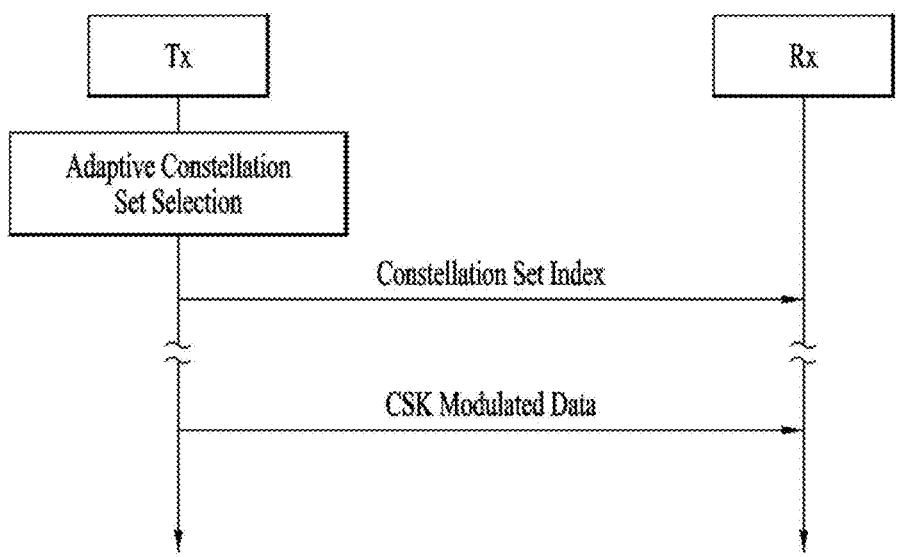

A signal flow between the transmitting side and the receiving side will be described with reference to FIG. 22.

i) A receiver (Rx) that desires to receive data performs color interference measurement or color interference sensing corresponding to Implementation 1.1. That is, the receiver may measure color interference based on visual sensor information or based on a reference signal.

ii) The receiver transmits interference information to the transmitter (Tx) based on the measured interference information. For example, the receiver may transmit SINR information (e.g., SINR G, SINR B, SINR R) or an index of normalized interference (e.g., 00=reserved, 01=G, 10=B, 11=R) for each color channel to the transmitter. In this operation, the transmission may be performed on the control channel (e.g., in the case of LTE, PUCCH, PDCCH, or control signaling for RRC connection) or on the data channel (e.g., in the case of LTE, PUSCH, PDSCH, etc.).

iii, iv) The transmitter (Tx) adaptively selects power control based on the received interference information. In this case, the degree of power control may be selected using a predefined method. The transmitter (Tx) transmits the intended data to the receiver (Rx) based on the signal power selected by the adaptive power control.

Implementation 3.4. Proposed Adaptive Constellation Set Indication for Hardware Capability A signal flow between the transmitting side and the receiving side will be described with reference to FIG. 23.

i) At the transmitting side (Tx), the hardware capability of the transmitting side is defined. The hardware capability may be predefined between the transmitting side and the receiving side. For example, normalized classes from Class 0 to Class 3 may be distinguished.

ii) A CSK constellation set suitable for each class is defined. The CSK constellation set suitable for each class may be predefined and shared between the transmitting side and the receiving side. Alternatively, it may be shared in establishing a connection with the receiving side (e.g., RRC Connection step in the case of LTE).

iii) The transmitter selects an optimal constellation set or a constellation set according to its own class index from among the predefined CSK constellation sets for the respective classes.

iv) The selected constellation set class index is transmitted from the transmitter to the receiver on the control channel. Alternatively, it may be shared in establishing a connection with the receiver (e.g., in the case of LTE, RRC Connection step, etc.). Alternatively, when there is data to be transmitted, the index may be shared before the data is transmitted (e.g., DCI in the case of LTE).

v) The transmitter modulates the data to be transmitted based on the selected constellation set and transmits the modulated data to the receiver.

While all operations of Implementation 3 have been described in terms of unicast or P2P, they may be equally applied even in a broadcast/multicast environment. For example, when classes of multiple devices are present, a constellation set class may be selected based on a class unit (e.g., Class 0) capable of representing the minimum color space to modulate and transmit data. Alternatively, when interference environments of multiple devices are present, a constellation set may be designed or selected in consideration of all interference to modulate and transmit data.

A method for transmitting a signal in visible light communication according to an aspect of the present disclosure may include receiving interference information from a receiving terminal, transmitting a constellation set index to the receiving terminal, and transmitting a signal modulated based on the constellation set index to the receiving terminal. The constellation set index may be selected based on the received interference information.

The interference information may be generated based on the intensity of the interference light source sensed by the receiving terminal. The method for transmitting a signal in visible light communication may further include transmitting a reference signal sequence for channel measurement to the receiving terminal, wherein the interference information may be generated based on measuring, by the receiving terminal, a channel using the reference signal sequence. The transmitting terminal may select a constellation set that avoids a region of the interference light source indicated by the received interference information. The transmitting terminal may increase the signal strength of a color channel corresponding to the region of the interference light source indicated by the received interference information. The constellation set index may be selected further based on a hardware capability of the transmitting terminal. The signal may be modulated through color-shift keying (CSK) modulation.

A transmitting terminal for transmitting a signal in visible light communication according to an aspect of the present disclosure may include a transceiver and a processor configured to control the transceiver to receive interference information from a receiving terminal, transmit a constellation set index to the receiving terminal, and transmit a signal modulated based on the constellation set index to the receiving terminal. The constellation set index may be selected based on the received interference information.

The interference information may be generated based on the intensity of the interference light source sensed by the receiving terminal. The processor may control the transceiver to transmit a reference signal sequence for channel measurement to the receiving terminal. The interference information may be generated based on measuring, by the receiving terminal, a channel using the reference signal sequence. The processor may select a constellation set that avoids a region of the interference light source indicated by the received interference information. The processor may increase the signal strength of a color channel corresponding to the region of the interference light source indicated by the received interference information. The constellation set index may be selected further based on a hardware capability of the transmitting terminal. The signal may be modulated through color-shift keying (CSK) modulation.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Mode for Disclosure

Various embodiments of the disclosure have been described in the best mode for carrying out the disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

What is claimed is:

1. A method for transmitting a signal by a transmitting terminal in visible light communication, the method comprising:
   receiving interference information from a receiving terminal;
   transmitting a constellation set index to the receiving terminal; and
   transmitting a signal modulated based on the constellation set index to the receiving terminal,
   wherein the constellation set index is selected based on the received interference information.

2. The method of claim 1, wherein the interference information is generated based on an intensity of an interference light source sensed by the receiving terminal.

3. The method of claim 1, further comprising:
   transmitting a reference signal sequence for channel measurement to the receiving terminal,
   wherein, based on measuring, by the receiving terminal, a channel using the reference signal sequence, the interference information is generated.

4. The method of claim 1, wherein the transmitting terminal selects a constellation set avoiding a region of an interference light source indicated by the received interference information.

5. The method of claim 1, wherein the transmitting terminal increases a signal strength of a color channel corresponding to a region of an interference light source indicated by the received interference information.

6. The method of claim 1, wherein the constellation set index is selected further based on a hardware capability of the transmitting terminal.

7. The method of claim 1, wherein the signal is modulated through color-shift keying (CSK) modulation.

8. A transmitting terminal for transmitting a signal in visible light communication, the transmitting terminal comprising:
   a transceiver; and
   a processor configured to control the transceiver to:
   receive interference information from a receiving terminal;

transmit a constellation set index to the receiving terminal; and transmit a signal modulated based on the constellation set index to the receiving terminal, wherein the constellation set index is selected based on the received interference information.

9. The transmitting terminal of claim 8, wherein the interference information is generated based on an intensity of an interference light source sensed by the receiving terminal.

10. The transmitting terminal of claim 8, wherein the processor controls the transceiver to transmit a reference signal sequence for channel measurement to the receiving terminal, wherein, based on measuring, by the receiving terminal, a channel using the reference signal sequence, the interference information is generated.

11. The transmitting terminal of claim 8, wherein the processor selects a constellation set avoiding a region of an interference light source indicated by the received interference information.

12. The transmitting terminal of claim 8, wherein the processor increases a signal strength of a color channel corresponding to a region of an interference light source indicated by the received interference information.

13. The transmitting terminal of claim 8, wherein the constellation set index is selected further based on a hardware capability of the transmitting terminal.

14. The transmitting terminal of claim 8, wherein the signal is modulated through color-shift keying (CSK) modulation.

* * * * *